MORTER & BERRY.
Cultivator.
No. 85,469.           Patented Dec. 29, 1868.
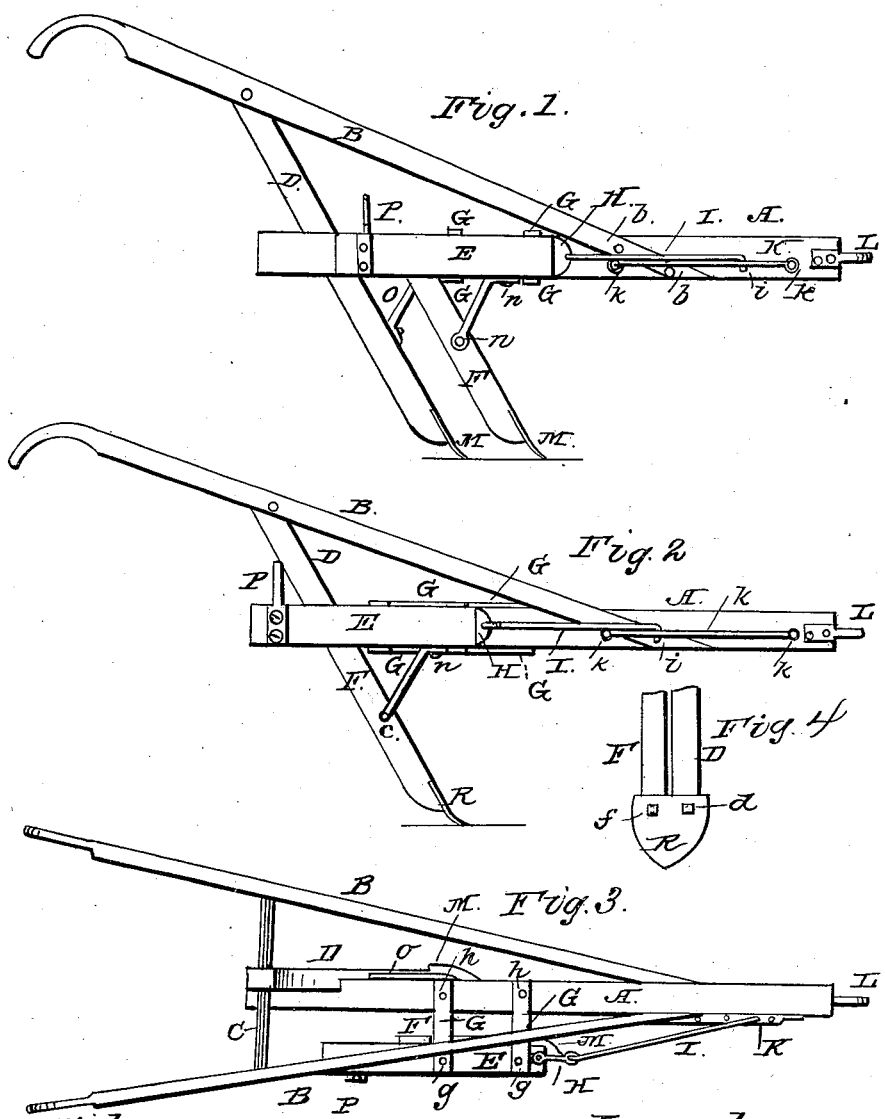

United States Patent Office.

G. W. MORTER AND EDWARD BERRY, OF HARTVILLE, OHIO.

Letters Patent No. 85,469, dated December 29, 1868.

IMPROVEMENT IN ADJUSTABLE SHOVEL-PLOW.

The Schedule referred to in these Letters Patent and making part of the same.

*To all whom it may concern:*

Be it known that we, G. W. MORTER and EDWARD BERRY, of Hartville, in the county of Stark, and State of Ohio, have invented a new and improved Adjustable Shovel-Plow; and we do hereby declare that the following is a full, clear, and exact description of our invention, reference being had to the accompanying drawings, forming a part of this specification, and to the letters of reference marked thereon, of which drawings—

Figure 1 is an elevation of our improved plow, with both single-shovels attached.

Figure 2 is an elevation of the same, with one double-shovel attached.

Figure 3 is a plan of the plow, with the several parts as shown in fig. 1.

Figure 4 is a front elevation of the lower portions of the shovel-standard, with the single broad shovel secured thereto.

Our invention consists, first, in the novel mode of securing a second beam, provided with a standard and shovel, to the main beam of a single-shovel plow, in such a manner as to form a double-shovel plow, which can be readily adjusted to any required width between the shovels, and which is of great utility in the cultivation of plants which are planted in rows, and require cultivation between said rows.

Our invention also relates to the novel mode of constructing and arranging the several parts of a shovel-plow, in such a manner as that said plow may be used with two shovels of an ordinary width and size, thus forming a double-shovel plow, similar, in its operation on the land, to that of an ordinary double-shovel plow, but which, when desired, may be readily converted into a single broad-shovel plow, the only change of parts required for this change being the substitution of a single broad shovel, in place of the two ordinary shovels, said broad-shovel plow being of great utility in cultivating between rows of plants which require that the earth be "hilled" up around them.

Our invention also relates to such novel mode of constructing and arranging the several parts of an interchangeable double or single-shovel plow, as has just been described, as that said plow, when used as a double-shovel plow, may be readily adjusted to any required distance between the shovels, and which can be converted from an adjustable double-shovel plow to a single broad-shovel plow, the only change of parts required being the change of the two ordinary shovels for a single broad shovel, whereby we give to the farmer, in a single implement, costing but little, if any, more than a common shovel-plow, all the advantages resulting from the use of an adjustable double-shovel plow, together with all the advantages resulting from the use of a single broad-shovel plow.

To enable others skilled in the art to make and use our invention, we will proceed to describe its construction and operation.

The principal beam, A, is of the form shown, and has secured to its front end the clevis L, to which the power is applied to draw the plow.

The standard D has an oblique slot cut in it, and is secured to the beam A, near its rear end, as shown, by means of bolts or screws, in an ordinary manner.

In the upper end of this standard D is secured the cross-bar C, which has its ends secured in the handles B B, and serves as a brace to said handles, the ends of which are secured to the beam A by the bolts or screws *b b*, as shown.

A brace-rod, O, is secured to the standard D and beam A by bolts or screws *c*, thus serving to strengthen said standard when any strain is brought to bear on the shovel M, which is secured to its lower end by a bolt or screw, *d*, shown in fig. 4.

The second beam, E, is secured to the beam A by parallel bars G G, placed above and below the said beams, as seen in figs. 1 and 2, and pivoted to said beams by bolts or screws *g g, h h*, shown in fig. 3.

The standard F has one-half of its upper and inner-end face cut away, and an oblique slot is cut in the beam E, in which the remaining upper end of the standard F is secured by bolts or screws, the standard F being strengthened in this position by a brace-rod, N, secured to the under face of beam E and outer face of standard F by screws or bolts *n c*, as shown.

A rod or handle, P, is secured to the beam E, to aid in moving it to and from the beam A.

A clevis, H, is secured to the front of the beam E, to which is secured the rod I, which has its front end turned down at right angles with the main rod, and which hooks into holes in the plate K, which is secured to the beam A by bolts or screws *k k*, a small pin, *i*, being inserted under the plate K, through a hole in the bent end of rod I, to prevent said bent end from springing out, whenever it is found desirable.

A shovel, M, is secured to the lower end of the standard F, by means of a bolt or screw, *f*, shown in fig. 4.

From the foregoing description, it is evident that, by unhooking the rod I from the plate K, the beam E may be brought up nearer to the beam A, by drawing the handle P towards the beam A, the plates G G turning around the pivots *g h* during the movement of said beam E, and that, by this movement of the beam E towards the beam A, the distance between the shovels M M may be changed as desired, and also that said shovels may be brought up in contact with each other, so as to act in a manner similar to a single-shovel plow.

If, now, the shovels M M be removed from the standards D F, by taking out the screws or bolts *d f*, the beam E may be brought up into contact with the beam A, this being the position shown in fig. 2, as the part of the standard F which was cut away will then come under the beam A, so that the standards D F will be brought up close to each other, as seen in fig. 4.

A single shovel, R, of the form shown in fig. 4, and provided with two holes, which have the same distance between them as that between the holes in the standards D and F for the bolts $d$ and $f$, when the said standards are in the position shown in figs. 2 and 4, is then secured to the standards D F, by the same bolts or screws, $d\ f$, which served to secure the shovels M M; from which it is readily seen that the double-shovelled plow, shown in figs. 1 and 3, has been changed to the single-shovel plow, shown in figs. 2 and 4, and that such change involves no change of parts, excepting the change of the two shovels M M for the single shovel R.

Having thus fully described our invention,

What we claim as new, and desire to secure by Letters Patent, is—

1. The second beam E, pivoted to the main beam A, by parallel bars G G G G, and having attached to it the standard F, with brace-rod N, substantially in the manner and for the purpose specified.

2. The rod I, with bent front end and plate K, with one or more holes therein, when used in combination with the beams A and E, pivoted to each other by the bars G G, substantially in the manner and for the purpose specified.

3. The double-shovel plow herein described, consisting of the beam A, handles B B, cross-bar C, standard D, second beam E, parallel bars G G, rod I, plate K, standard F, braces O N, and shovels M M, the several parts being constructed and combined substantially as and for the purpose specified.

4. So constructing a shovel-plow as that it may be changed from a double-shovel plow to a single-shovel plow, without any change of parts, except the change of the two shovels for a single shovel, substantially in the manner herein specified.

5. So constructing an interchangeable double or single-shovel plow, as that, when used as a double-shovel plow, the distance between the two shovels may be changed as desired, the several parts being so arranged, as that the only change of parts required, in a change from a double to a single-shovel plow, shall be the change of the two shovels for a single shovel, substantially in the manner herein specified.

As evidence that we claim the foregoing, we have hereunto set our hands, in the presence of two witnesses, this 27th day of October, A. D. 1868.

G. W. MORTER.
EDWARD BERRY.

Witnesses:
B. E. DRAYER,
S. S. GEIB.